United States Patent
Yang

(10) Patent No.: US 7,796,567 B2
(45) Date of Patent: Sep. 14, 2010

(54) METHOD AND SYSTEM FOR IMPLEMENTING SOFT TIME REUSE IN WIRELESS COMMUNICATION SYSTEM

(75) Inventor: Xuezhi Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 627 days.

(21) Appl. No.: 11/834,348

(22) Filed: Aug. 6, 2007

(65) Prior Publication Data

US 2008/0008149 A1 Jan. 10, 2008

Related U.S. Application Data

(63) Continuation of application No. PCT/CN2006/000781, filed on Apr. 25, 2006.

(30) Foreign Application Priority Data

Apr. 30, 2005 (CN) ......................... 2005 1 0069500

(51) Int. Cl.
*H04J 3/00* (2006.01)
(52) U.S. Cl. ...................................... 370/336; 370/329
(58) Field of Classification Search .................. 370/310, 370/328, 329, 336
See application file for complete search history.

(56) References Cited

U.S. PATENT DOCUMENTS

| | | | |
|---|---|---|---|
| 6,259,685 B1 * | 7/2001 | Rinne et al. .................. | 370/330 |
| 6,400,960 B1 * | 6/2002 | Dominique et al. .......... | 455/522 |
| 6,590,878 B1 * | 7/2003 | Uchida et al. ................ | 370/330 |
| 6,744,743 B2 * | 6/2004 | Walton et al. ................ | 370/318 |
| 2003/0008654 A9 * | 1/2003 | Senarath et al. ............. | 455/450 |
| 2003/0017830 A1 * | 1/2003 | Kayama et al. .............. | 455/450 |
| 2004/0063468 A1 * | 4/2004 | Frank .......................... | 455/561 |
| 2005/0272432 A1 * | 12/2005 | Ji et al. ......................... | 455/449 |
| 2006/0135171 A1 * | 6/2006 | Roy et al. .................... | 455/450 |
| 2010/0039967 A1 * | 2/2010 | Karabinis et al. ........... | 370/294 |
| 2010/0061341 A1 * | 3/2010 | Li et al. ....................... | 370/331 |

FOREIGN PATENT DOCUMENTS

CN 1251731 4/2000

\* cited by examiner

*Primary Examiner*—Chi H Pham
*Assistant Examiner*—Robert Lopata
(74) *Attorney, Agent, or Firm*—Leydig, Voit & Mayer, Ltd.

(57) ABSTRACT

A method for implementing soft time reuse includes: selecting for a cell or sector at least one time slot as a primary time slot and at least another one time slot as a secondary time slot; using the primary time slot at the border of the cell or sector; setting a first transmit power threshold for the primary time slot; setting a second transmit power threshold for the secondary time slot; the primary time slot selected for the cell or sector and a primary time slot selected for another cell or sector adjacent to the cell or sector are non-overlapped, and the first transmit power threshold is higher than the second transmit power threshold. A system is also provided by the embodiments of the present invention. The system and method reduce the interference between cells or sectors effectively and improve the resource utilization.

14 Claims, 4 Drawing Sheets

METHOD AND SYSTEM FOR IMPLEMENTING SOFT TIME REUSE IN WIRELESS COMMUNICATION SYSTEM

This application is a continuation of International Patent Application No. PCT/CN2006/000781, filed Apr. 25, 2006, which claims priority to Chinese Patent Application No. 200510069500.1, filed Apr. 30, 2005, both of which are hereby incorporated by reference.

FIELD OF THE INVENTION

The present invention relates to soft time reuse techniques, and more particularly, to a method and a system for implementing soft time reuse in a wireless communication system.

BACKGROUND OF THE INVENTION

The next generation mobile communication system needs to support multiple services such as voice, data, audio, video, image and so on. Therefore, it is desirable for the next generation mobile communication system to support a higher data transmission rate, higher spectrum efficiency and perfect Quality of Service (QoS) guarantee mechanisms, and provide better mobility support and wireless network coverage, so as to provide users with communication services at all times and all places. Presently, the next generation mobile communication system has developed from the second generation mobile communication system and the third generation mobile communication system into the fourth generation mobile communication system. The second generation mobile communication system uses the Time Division Multiple Access (TDMA) and the narrowband Code Division Multiple Access (CDMA) as dominant access techniques, e.g., the Global System for Mobile Communications (GSM) and the CDMA IS-95 mobile communications system. The third generation mobile communication system uses the Wideband CDMA (WCDMA) as dominant access techniques, e.g., the Universal Mobile Telecommunication System (UMTS) and the WCDMA mobile communication system. In the CDMA technique, data symbols of one user will occupy the entire width of carrier frequency and different users or user data are distinguished by means of spread spectrum codes. Since the multi-path channel makes the orthogonality between spread spectrum codes impossible, the CDMA technique becomes a self-interference system. Therefore, the system capacity and spectrum efficiency of the current CDMA technique are unable to meet the requirements of wideband wireless communications.

Since the 1990's, a multi-carrier technique has been in the spotlight among wideband wireless communication techniques. It divides one wideband carrier into multiple sub-carriers on which data are transmitted in parallel. In most system applications, the width of a sub-carrier is less than the coherent bandwidth of the propagation channel. In this way, every sub-carrier demonstrates flat fading in a frequency-selective channel, which makes it possible to reduce inter-symbol interference and may support high-speed data transmission without complex channel equalization required. There are various multi-carrier techniques, for example, the Orthogonal Frequency Division Multiplexing (OFDM), the Multi-Carrier CDMA (MC-CDMA), the Multi-Carrier Direct Spread CDMA (MC-DS-CDMA), the Multi-Tone CDMA (MT-CDMA), the Multi-Carrier TDMA (MC-TDMA), the time-frequency two-dimension spreading technique and other spreading techniques based on the above mentioned techniques.

As a representative technique in multi-carrier techniques, the OFDM technique divides a given channel into multiple orthogonal sub-channels in the frequency domain and permits the overlap of partial frequency spectrum of sub-carriers. As long as the orthogonality between sub-carriers is guaranteed, data signals may be separated from the overlapping sub-carriers.

The OFDM technique was first invented in the middle of the 1960's. The OFDM technique, however, was not widely applied for a long time because the development of the OFDM technique was impeded by many difficulties. Firstly, in the OFDM technique the orthogonality between sub-carriers is required. Although the orthogonality between sub-carriers may be implemented theoretically by means of Fast Fourier Transform (FFT), it is impossible in practical applications to provide a device implementing such complex real time Fourier transform through the technical measures of the day. Secondly, the requirements on the stability of a transmitter oscillator and a receiver oscillator as well as the linearity of a radio frequency power amplifier also prevent the OFDM technique from being applied in practical applications. Since the 1980's, the development of a large scale integrated circuit technique has solved the problem of implementing the FFT. Along with the development of the Data Signal Processor (DSP) technique, the OFDM technique has been turned from the theory into practical application.

The OFDM technique rapidly becomes a study focus due to its inherent strong resistance to delay spread and its high spectrum efficiency, and is adopted by multiple international specifications such as the European Digital Audio Broadcast (DAB), the European Digital Video Broadcast (DVB), the High Performance Local Area Network (HIPERLAN), the Institution of Electrical and Electronics Engineers (IEEE) 802.11 Wireless LAN (WLAN) and the IEEE802.16 wireless Metropolitan Area Network (MAN). The multi-carrier technique was discussed as a dominant access technique at the Radio Access Network (RAN) conference of 3rd Generation Partnership Project (3GPP) held in 2004.

In 1947, the Bell Laboratories set forth the cellular concept. Owing to the propagation fading of radio waves, one carrier frequency may be reused outside a certain distance. Thus, compared with the macro-cell networking technique, the cellular technique has higher spectrum efficiency. FIGS. 1A to 1C are simplified schematic diagrams illustrating the conventional frequency reuse pattern with the reuse factor equal to 2, 3 and 4 respectively.

In the first generation mobile communication system Frequency Division Multiple Access (FDMA) and the second generation mobile communication system TDMA, 7, 9 or 11 is usually chosen as the frequency reuse factor to eliminate the co-channel interference. In the CDMA technique, the frequency reuse factor 1 is adopted, the same carrier frequency is used in all cells, and different scramble codes are set to distinguish one cell from another. In this way, complex frequency planning is not needed, and it is easy to implement soft switching and improve the spectrum efficiency. Therefore, the frequency reuse factor being set as 1 is regarded as a great advantage of the CDMA technique.

The forgoing techniques are frequency-based network planning. Of course, analogously to the frequency reuse scheme, a time reuse scheme may also be used, that is, the time is divided into time slots. The inter-cell interference may be reduced when different cells use different time slots.

SUMMARY OF THE INVENTION

The Embodiments of the present invention provide a method and a system for implementing soft time reuse in a wireless communication system.

A method for implementing soft time reuse in a wireless communication system includes:

selecting for a cell or sector at least one time slot as a primary time slot and at least another one time slot as a secondary time slot;

using the primary time slot at the border of the cell or sector;

setting a first transmit power threshold for the primary time slot;

setting a second transmit power threshold for the secondary time slot; wherein the primary time slot selected for the cell or sector and a primary time slot selected for another cell or sector adjacent to the cell or sector are non-overlapped, and the first transmit power threshold is higher than the second transmit power threshold.

A system for implementing soft time reuse in a wireless communication system, wherein time slots are divided into at least two time slot groups, the system includes:

a first unit, configured to select for a cell or sector at least one time slot as a primary time slot and at least another one time slot as a secondary time slot, and use the primary time slot at the border of the cell or sector, wherein the primary time slot selected for the cell or sector and a primary time slot selected for another cell or sector adjacent to the cell or sector are non-overlapped; and a second unit, configured to set a first transmit power threshold for the primary time slot and a second transmit power threshold for the secondary time slot, wherein the first transmit power threshold is higher than the second transmit power threshold.

As can be seen from the above technique solution, at the border of the cell or sector, i.e., at an area away from the base station of the cell or sector, a time reuse scheme with the time reuse factor equal to 3 is used; in an inner zone of the cell or sector, i.e., in an area nearby the base station of the cell or sector, a time reuse scheme with the time reuse factor equal to 1 is used. Since transmit power is restricted in the inner zone of the cell or sector, an island coverage in which the time reuse factor equals to 1 is formed. Setting different time reuse factors for different areas of one cell or sector not only avoids interference between adjacent cells or sectors in the case of continuous coverage so as to raise the communication rate at the border of the cell or sector but also adequately uses precious communication resources so as to implement high rate communications. In accordance with the method and system provided by the embodiments of the present invention, the interference between cells or sectors may be eliminated by means of a controllable time reuse scheme, which is favorable to implement resource management strategies and improve the stability of networks.

DETAILED DESCRIPTION OF THE INVENTION

The present invention is hereinafter further described in detail with reference to the accompanying drawings and embodiments.

In accordance with the embodiments of the present invention, the system and the method for implementing soft time reuse may reduce inter-cell interference in a wireless communication system and increase the resource utilization of the wireless communication system by network planning based on time.

Figure 1A:
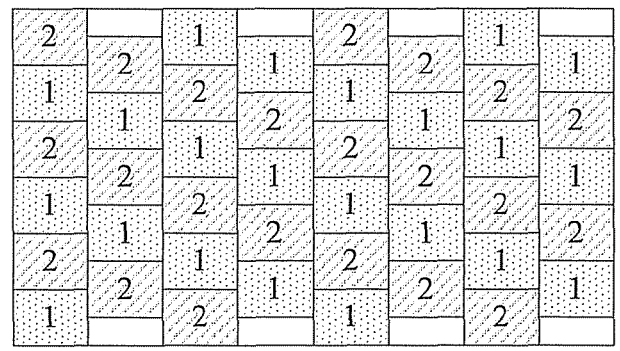
FIG. 1A is a simplified schematic diagram illustrating the conventional frequency reuse pattern with a frequency reuse factor equal to 2.
Figure 1B:
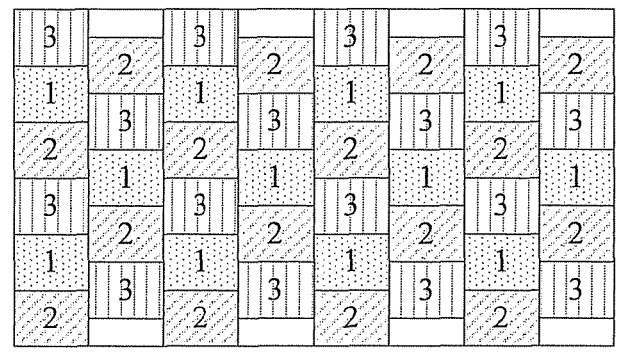
FIG. 1B is a simplified schematic diagram illustrating the conventional frequency reuse pattern with a frequency reuse factor equal to 3.
Figure 1C:
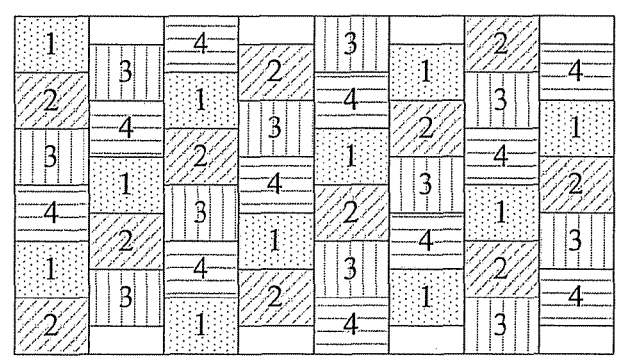
FIG. 1C is a simplified schematic diagram illustrating the conventional frequency reuse pattern with a frequency reuse factor equal to 4.
Figure 2:
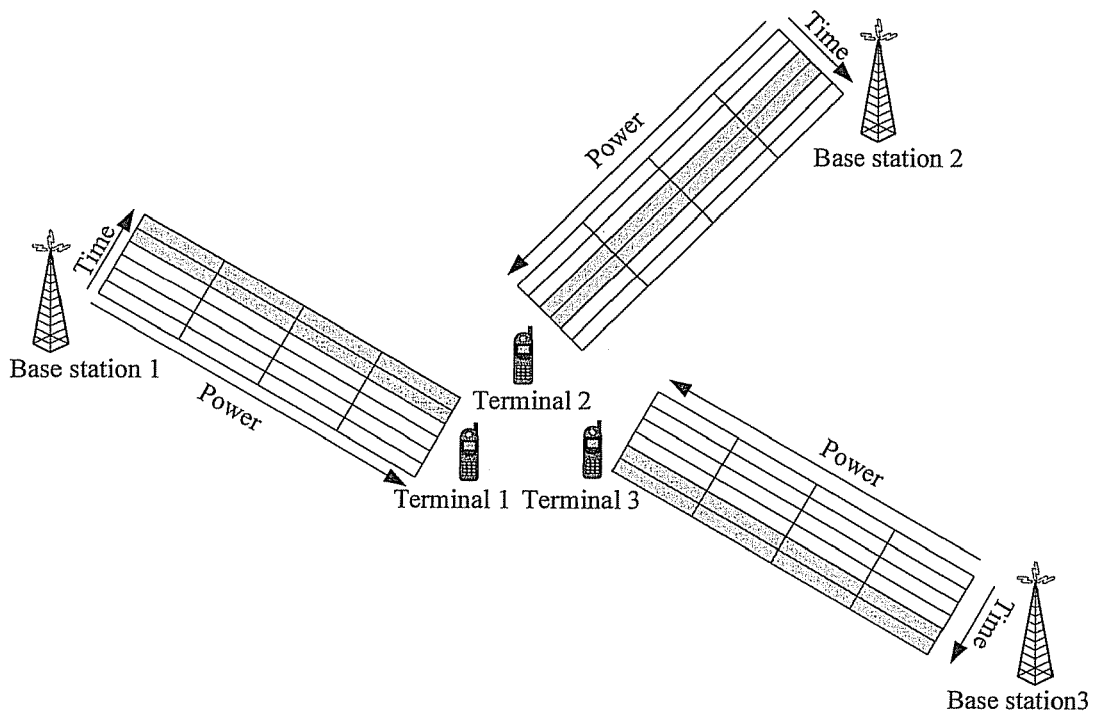
FIG. 2 is a simplified schematic diagram illustrating the conventional networking using a time reuse scheme.

In the time reuse scheme, different cells occupy different times, and may use a same frequency or different frequencies. As shown in FIG. 2, terminals are located at the cross point of three cells, i.e., Terminal 1 is located at the border of an area managed by Base station 1, Terminal 2 is located at the border of an area managed by Base station 2, Terminal 3 is located at the border of an area managed by Base station 3, and the terminals at different cells use different times.

In a cellular communication system, the Signal to Interference Ratio (SIR) of a receiver may be expressed as the following:

$$SIR = \frac{P_{rx}}{P_{intra-cell} + P_{inter-cell} + P_n},$$

in which $P_{rx}$ represents the receive power of available signals, $P_{int\ ra-cell}$ represents the intra-cell interference power, $P_{int\ er-cell}$ represents the inter-cell interference power and $P_n$ represents thermal noise power.

If the carrier width is W and the time reuse factor is reuse_factor in a wireless communication system, intra-cell multiple access interference may be eliminated by means of receiver algorithms, i.e., $P_{int\ ra-cell}$ may be equal to 0. As a result, the SIR of the receiver may be expressed as:

$$SIR = \frac{P_{rx}}{P_{inter-cell} + P_n}.$$

If the channel is a flat fading channel, the maximal error-free transmission rate in a cell, according to the Shannon channel capacity formula, may be expressed as the following:

$$C = \frac{W \cdot \log_2(1 + SIR)}{\text{reuse\_factor}}.$$

Figure 3A:
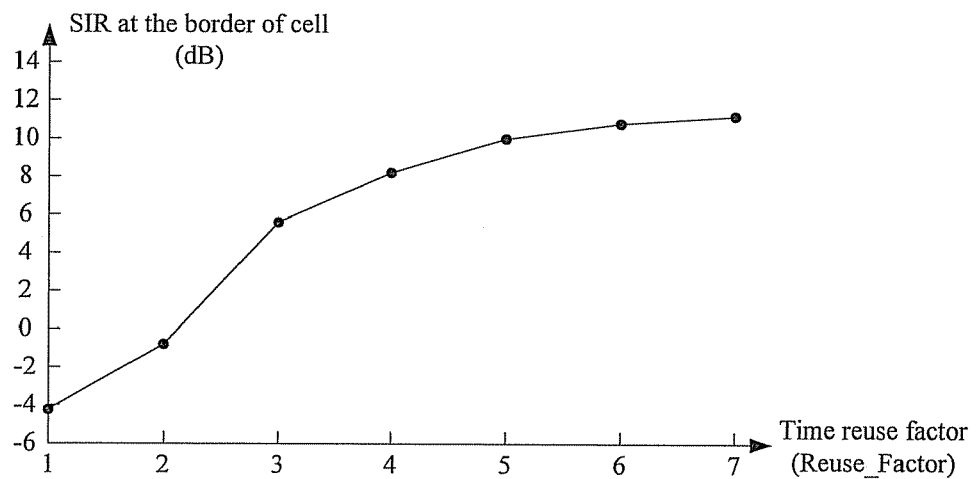
FIG. 3A is a simplified curve diagram illustrating the trend that the Signal to Interference Ratio (SIR) at the border of a cell changes with the time reuse factor in a conventional time reuse scheme.
Figure 3B:
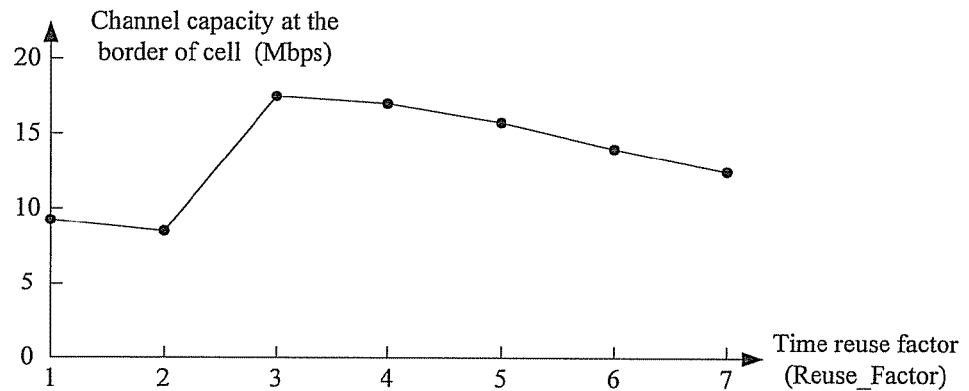
FIG. 3B is a simplified curve diagram illustrating the trend that the channel capacity at the border of a cell changes with the time reuse factor in a conventional time reuse scheme.

In different time planning schemes, if terminals are located at the cross point of three cells, as shown in FIG. 2, Radio Frequency (RF) parameters shown in Table 1 and the above formula may be used to obtain the trend that the SIR and the channel capacity at the border of cell change with the time reuse factor, and results are as shown in FIGS. 3A and 3B.

TABLE 1

| RF parameter | Value | Computing formula |
|---|---|---|
| Carrier width W (MHz) | 20 | A |
| Thermal noise density (dBm/Hz) | −174 | B |
| Noise coefficient of receiver (db) | 5 | C |
| Thermal noise power $P_n$ (dBm) | −96 | D = 10 * lgA + B + C |
| Transmit power of base station (dBm) | 45 | E |
| Cell radius (Km) | 1 | F |
| Path loss (dB) | 137.3 | G = 137.3 + 35.2 * lg(F) |

FIG. 3A is a simplified schematic diagram illustrating the trend that the SIR at the border of a cell changes with the time reuse factor in a conventional time reuse scheme and FIG. 3B is a simplified schematic diagram illustrating the trend that the channel capacity at the border of a cell changes with the time reuse factor in a conventional time reuse scheme. As shown in FIGS. 3A and 3B, the channel capacity at the border of the cell in the case that the time reuse factor is equal to 1 are almost the same as that in the case that the time reuse factor is equal to 2. The channel capacity at the border of the cell is the maximum in the case that the time reuse factor is equal to 3, and then the channel capacity at the border of the cell gradually decreases along with the increase of the time reuse factor. It may be thus included that 3 is an ideal time reuse factor at the border of the cell. In addition, several problems need to be described in accordance with FIGS. 3A and 3B.

1. The smaller the time reuse factor is, the longer the time available to each cell is, and the more serious the co-channel interference is, and the lower the SIR is; vice versa, the greater the time reuse factor is, the shorter the time available to each cell is, and the lighter the co-channel interference is, and the higher the SIR is.

2. When the time reuse factor is equal to 1 or 2, since co-frequency adjacent cells may exist, the co-channel interference will be serious and the SIR will be as low as −4.4 dB and −1.1 dB as shown in FIG. 3A, which results in a smaller channel capacity at the border of the cell, i.e., the channel capacity is as low as 8 Mbps to 9 Mbps.

3. When the time reuse factor is 3, the interference of the co-frequency adjacent cells is eliminated, so the SIR increase significantly, e.g., the SIR is equal to 5.89 dB as shown in FIG. 3A. Although only ⅓ of time is utilized at the border of the cell, the increase of the SIR may compensate the losses caused by the shortening of time. As shown in FIG. 3B, the channel capacity increases by nearly 100% to 15 Mbps.

4. When the time reuse factor continuously increases, the co-channel interference continuously decreases and the SIR continuously increases. When the time reuse factor is equal to 7, the SIR reaches 11 dB. Since the channel capacity and the SIR comply with logarithmic relation, the increase of the channel capacity acquired through the increase of the SIR is unable to compensate the losses caused by the shortening of time. Therefore, the channel capacity presents a descending trend as a whole.

5. In the formula $$SIR = \frac{P_{rx}}{P_{int er-cell} + \frac{P_n}{\text{reuse\_factor}}},$$

the intra-cell multiple access interference is eliminated by means of receiver algorithms, i.e., the receiver noise mainly includes the co-channel interference and the thermal noise. Since the intra-cell interference is a main noise component in the conventional CDMA communication system and RAKE receiver techniques, the intra-cell multiple access interference can not be eliminated by means of the receiver algorithms in the conventional CDMA communication system and the RAKE receiver techniques.

6. If the time reuse factor increases beyond 3, the channel capacity at the border of the cell just decrease a little and is still higher than the channel capacity in the case that the time reuse factor is equal to 1 or 2. However, when the time reuse factor reaches a large number, e.g., 7, the SIR of the receiver may reach 11 dB. Though the SIR increases because of the decrease of the co-channel interference, the receive power of the receiver does not increase, which means that the anti-interference capability of the receiver is poor. Such factors as the interference of environments around the receiver, the residual interference in the cell caused by demodulation algorithms or the adjacent channel interference noise will greatly reduce the SIR and the channel capacity. As a result, the channel capacity at the border of the cell presents a descending trend when the time reuse factor is greater than 3.

The channel capacity at the border of the cell is increased and the inter-cell interference is avoided by using the time reuse at the border of the cell. The border of the cell is an area with the severest interference in the cell, but the terminal may be located at the center of the cell and be near a base station in practical operations. If the terminal is close to the base station, the signal power from the cell is high and the interference from adjacent cells is low, which makes it possible to acquire a higher SIR. In this way, the time of adjacent cells may be used at the center of the cell, thereby implementing the high rate communications.

Figure 4:
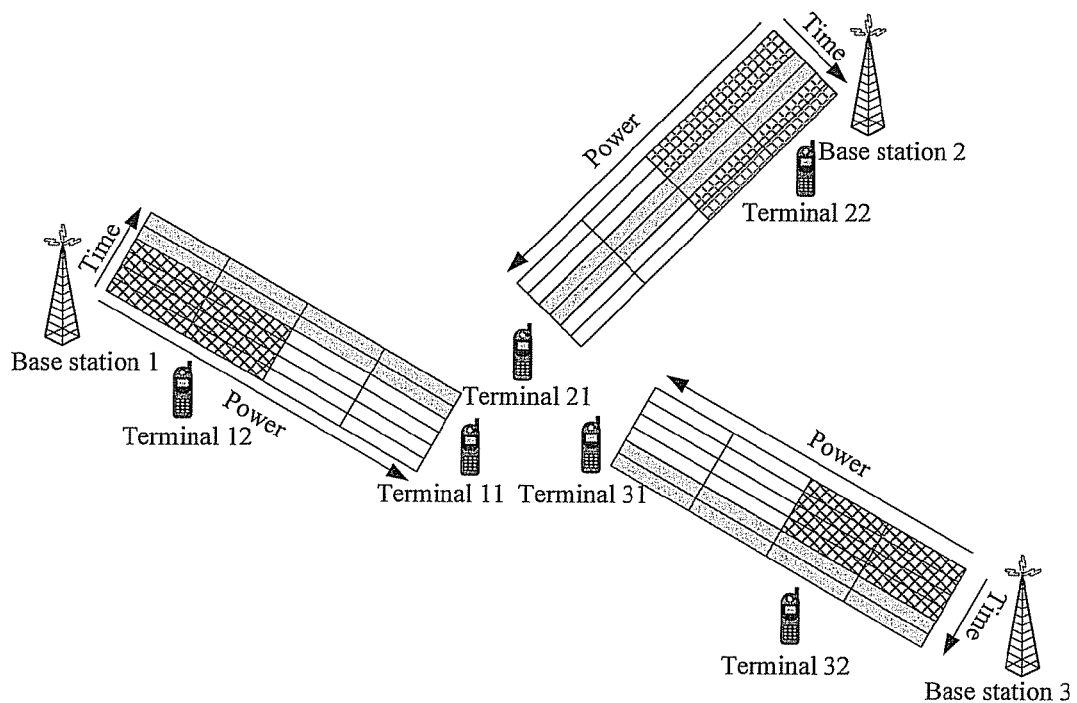
FIG. 4 is a simplified schematic diagram illustrating the networking using a soft time reuse scheme according to an embodiment of the present invention.

FIG. 4 is a simplified schematic diagram illustrating the networking using a soft time reuse scheme according to an embodiment of the present invention. In FIG. 4, Base station 1 manages Terminal 11 and Terminal 12, Terminal 12 is located in an inner zone of the area managed by Base station 1, for example, 30% of the radius of the cell taking Base station 1 as the center, and Terminal 11 is located at the border of the area managed by Base station 1, for example, 90% of the radius of the cell talking Base station 1 as the center. Base station 2 manages Terminal 21 and Terminal 22, Terminal 22 is located in an inner zone of the area managed by Base station 2, for example, 20% of the radius of the cell taking Base station 2 as the center, and Terminal 21 is located at the border of the area managed by Base station 2, for example, 85% of the radius of the cell taking Base station 2 as the center. Base station 3 manages Terminal 31 and Terminal 32, Terminal 32 is located in an inner zone of the area managed by Base station 3, for example, 50% of the radius of the cell talking Base station 3 as the center, and Terminal 31 is located at the border of the area managed by Base station 3, for example, 95% of the radius of the cell taking Base station 3 as the center. In an embodiment of the present invention, different time slots are allocated to terminals at the border of the cell, which may avoid or reduce the co-channel interference, and improve the communication rate at the border of the cell. The terminal in the inner zone of the cell may reduce the interference with the adjacent cells by limiting the transmit power and utilize the time adequately to improve the communication rate.

As can be seen from the above description, according to an embodiment of the present invention, at the border of a cell, i.e., in the area away from the base station of the cell, a time reuse scheme with the time reuse factor equal to 3 is used, and in the inner zone of the cell, i.e., in the area near the base station of the cell, a time reuse scheme with the time reuse factor equal to 1 is used. Since the transmit power is restricted in the inner zone of the cell, island coverage in which the time reuse factor equals to 1 is formed. Setting different time reuse factors for different areas of one cell not only avoid the interference between adjacent cells in the case of continuous coverage so as to improve the communication rate at the border of the cell but also adequately utilize precious communication resources so as to implement high rate communications. Therefore, the method provided by an embodiment of the present invention may be called a soft time reuse method.

In an embodiment of the present invention, the available time is divided into N time slot groups, and each cell selects one time slot group as its primary time slot and other time slot groups as its secondary time slots. Different transmit power thresholds are set for the primary time slot and the secondary time slots of each cell, and the transmit power corresponding to each time slot is unable to exceed the transmit power threshold set for the time slot. For example, the transmit power threshold of the primary time slot is set as higher than the transmit power thresholds of the secondary time slots. The border of the cell is determined through the coverage area of the transmit power threshold of the primary time slot. The terminal in the zone of the cell uses the secondary time slots and the terminal at the border of the cell uses the primary time slot. Furthermore, the time slots of different time slot groups do not overlap each other. In this way, the interference at the borders of adjacent cells may be decreased greatly.

In addition, the divided time slot groups and the selected primary time slot and secondary time slots may be fixed, or the time slot groups and the primary time slot and the secondary time slots may change dynamically based on time as long as the same time slot is not used synchronously at adjacent cells. For example, there are six time slots identified as 1, 2, 3, 4, 5 and 6 respectively, the time slots identified as 1 and 2 are placed into one time slot group, the time slots identified as 3 and 5 are placed into one time slot group, the time slot identified as 4 is placed into one time slot group and the time slot identified as 6 is placed into one time slot group. Cell 1 selects the time slot group including the time slots identified as 1 and 2 as its primary time slot and other time slot groups as its secondary time slots, and the adjacent Cell 2 selects the time slot group including the time slot identified as 4 as its primary time slot and other time slot groups as its secondary time slots. After a period of time, the six time slot groups may be regrouped, the time slots identified as 2 and 5 are placed into one time slot group, the time slots identified as 4 and 6 are placed into one time slot group, the time slot identified as 1 is placed into one time slot group and the time slot identified as 3 is placed into one time slot group. Cell 1 selects the time slot group including the time slots identified as 4 and 6 as its primary time slot and other time slot groups as its secondary time slots, and the adjacent Cell 2 selects the time slot group including the time slot identified as 3 as its primary time slot and other time slot groups as its secondary time slots.

If macro problems like system capacity and spectrum efficiency are considered, the typical value of N is 3. Other values are also be assigned to N, e.g., 4, 5, 6, 7 or 8, etc.

A full coverage type channel, such as a broadcast channel and public control channel, may be set to use the primary time slot of the cell only and adopt comparatively higher transmit power. Although the coverage area of adjacent cells overlaps partially each other, the interference between adjacent cells is comparatively lower, which is favorable for terminals to select cell, handover and accurately receive public control information.

In an embodiment of the present invention, the primary time slot may be used to bear signalings to guarantee the reliability of the signalings.

The service channel may be set to only use the primary time slot when a terminal is located at the border of the cell. Since the primary time slots of adjacent cells do not overlap each other, it is possible to reduce the interference between adjacent cells and improve the communication quality.

The primary time slot and the secondary time slots may be used simultaneously when the terminal is close to the base station, so as to transmit data and multimedia services at a high rate. Since the transmit power of the secondary time slots are relatively lower, the interference with the adjacent cells is reduced and the spectrum efficiency is improved. The distance between the terminal and the base station may be predefined, e.g., 75% of the coverage area of the cell. If the distance is within the predefined distance, it is regarded that the terminal is close to the base station.

Figure 5:
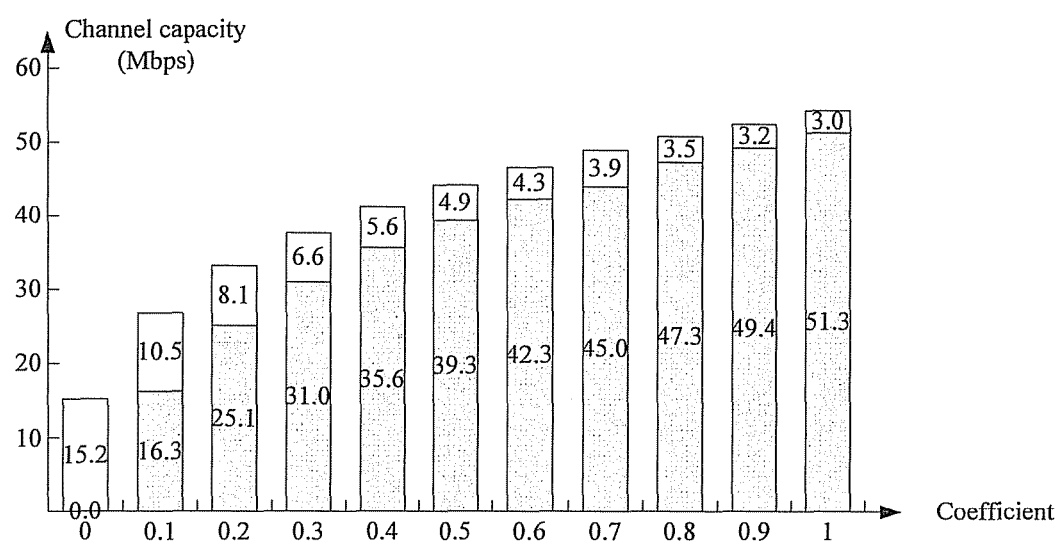
FIG. 5 is a simplified schematic diagram illustrating the channel capacity in a soft time reuse scheme according to an embodiment of the present invention.

As shown in FIG. 4, if Terminal 11, 21 and 31 are located at the border of their respective cells, while Terminal 12, 22 and 32 are located in the inner zone of their respective cells, e.g., less than or equal to ½ radius of their respective cells taking base stations as center. The transmit power used by the terminals in the inner zone of the cell is less than that used by the terminals at the border of the cell. FIG. 5 is a simplified schematic diagram illustrating the channel capacity in a soft time reuse scheme according to an embodiment of the present invention. In FIG. 5, the coefficient shown by the horizontal axis is the ratio of the transmit power used by the terminals in the inner zone of the cell to that used by the terminals at the border of the cell. The gray blocks represent the channel capacity in the inner zone of the cell and the white blocks represent the channel capacity at the border of the cell. It can be seen from FIG. 5 that:

1. When the coefficient is equal to 0, the channel capacity is equivalent to the channel capacity at the border of the cell in the case that the time reuse factor is equal to 3, which is equal to 15.2 Mbps.

2. When the coefficient gradually increases, i.e., the transmit power used by the terminals in the inner zone of the cell gradually increases, the channel capacity in the inner zone of the cell gradually increases, the channel capacity at the border of the cell gradually decreases, and the channel throughput of the cell increases.

3. When the coefficient is up to 1, the channel capacity at the border of the cell decrease to 2.96 Mbps, just equal to ⅓ of channel capacity in the case that the time reuse factor is equal to 1, because only ⅓ of the total time is utilized at the border of the cell while the interference remains the same as the inference in the co-frequency reuse scheme.

The wireless communication system adopting soft time reuse may properly allocate time according to network conditions and obtain optimal system throughput and performance through combining link adaptive techniques.

In the fore-going description, the inner zone of the cell may be the area whose center is the base station and radius is not greater than 50% of the radius of the cell, and the rest area of the cell may be taken as the border of the cell. The inner zone of the cell may also be the area whose center is the base station and radius is not greater than 60% of the radius of the cell may also be taken as the inner zone of the cell, and the rest area of the cell may be taken as the border of the cell. The inner zone of the cell may also be the area whose center is the base station and radius is not greater than 35% of the radius of the cell may also be taken as the inner zone of the cell, and the rest area of the cell may be taken as the border of the cell.

An embodiment of the present invention further provides a wireless communication system for implementing soft time reuse, and the simplified schematic diagram thereof is as shown in FIG. 4. The system includes: at least two base stations and at least one terminal managed by the base station. The adjacent base stations respectively haves different primary time slots and different transmit power thresholds of the different primary time slots. The base stations further have the secondary time slots and the transmit power thresholds of the secondary time slots, wherein terminals at the border of a cell or sector exchange services with the home base station using the primary time slot of the home base station and the transmit power within the transmit power threshold of the home base station;

terminals located in the inner zone of the cell or sector exchange services with the home base station using the secondary time slots of the home base station and the transmit power within the transmit power thresholds of the secondary time slots or the primary time slot of the home base station and the transmit power within the transmit power threshold of the primary time slots.

In an embodiment of the present invention, all time slots may be divided into at least two time slot groups, e.g., three time slot groups, in a wireless communication system. These time slot groups does not overlap each other, and the primary time slot is one of these time slot groups.

In an embodiment of the present invention, the transmit power threshold of the primary time slot is higher than that of the secondary time slots.

The method and system according to an embodiment of the present invention is applicable to not only the time reuse in a cell but also the time reuse in a sector, that is, at the border of a sector, i.e., an area away from the base station of the sector, a time reuse scheme with the time reuse factor equal to 3 is used, and in an inner zone of the sector, i.e., an area nearby the base station of the sector, a time reuse scheme with the time reuse factor equal to 1 is used. Since the transmit power is restricted in the inner zone of the sector, island coverage with the time reuse factor equal to 1 is formed.

The method and system according to an embodiment of the present invention is especially applicable to the case that the frequency reuse factor is 1, in which inter-cell interference may be eliminated by means of time reuse. However, the method and system according to an embodiment of the present invention is also applicable to the case that the other frequency reuse factors are used, in which the inter-cell interference may be further eliminated based on frequency reuse.

The above method and system may be applicable to any wireless communication system, for example, the multi-carrier communication system and the single-carrier communication system. The multi-carrier communication system includes the OFDM wireless communication system, the multi-carrier CDMA wireless communication system, the multi-carrier direct spread CDMA wireless communication system, the multi-tone CDMA wireless communication system, the multi-carrier TDMA wireless communication system and the time-frequency domain two-dimension spreading multi-carrier wireless communication system.

To sum up, the foregoing are only preferred embodiments of the present invention and are not for use in limiting the protection scope thereof.

What is claimed is:

1. A method for implementing soft time reuse in a wireless communication system, comprising:
   selecting for a cell or sector at least one time slot as a primary time slot and at least another one time slot as a secondary time slot;
   using the primary time slot at the border of the cell or sector;
   setting a first transmit power threshold for the primary time slot;
   setting a second transmit power threshold for the secondary time slot; wherein
   the primary time slot selected for the cell or sector and a primary time slot selected for another cell or sector adjacent to the cell or sector are non-overlapped, and
   the first transmit power threshold is higher than the second transmit power threshold.

2. The method of claim 1, wherein the selecting at least one time slot as a primary time slot and at least one time slot as a secondary time slot comprises:
   dividing time slots into at least one first group and at least one second group;
   selecting a time slot in the at least one first group as the primary time slot; and
   selecting a time slot in the at least one second group as the secondary time slot.

3. The method of claim 2, wherein the dividing time slots into at least one first group and at least one second group is implemented by the following way:
   dividing the time slots into the at least one first group and at least one second group dynamically.

4. The method of claim 2, wherein the dividing time slots into at least one first group and at least one second group is implemented by the following way:
   dividing the time slots into the at least one first group and at least one second group in a static way.

5. The method of claim 2, wherein the time slots are divided into three groups, one of the three groups is selected as the primary time slot, and the other two groups are selected as the secondary time slot.

6. The method of claim 1, wherein the transmit power of the primary time slot is not higher than the first transmit power threshold set for the primary time slot; and
   the transmit power of the secondary time slot is not higher than the second transmit power threshold set for the secondary time slot.

7. The method of claim 1, further comprising:
   using the primary time slot and the secondary time slot in an inner zone of the cell or sector; wherein
   the transmit power of one time slot used in the cell or sector is not higher than the first transmit power threshold when the primary time slot is used in the cell or sector, and the transmit power of one time slot used in the inner zone of the cell or sector is not higher than the second transmit power threshold when the secondary time slot in the inner zone of the cell or sector.

8. The method of claim 1, further comprising:
   setting a full coverage type channel in the cell or sector to use the primary time slot.

9. The method of claim 1, further comprising:
setting the primary time slot in the cell or sector to bear signaling.

10. The method of claim 1, further comprising:
setting a service channel in the cell or sector to use the primary time slot when a terminal is located in an area beyond a predetermining distance to the center of the cell or sector.

11. The method of claim 1, further comprising:
adjusting the ratio of the second transmit power threshold set for the secondary time slot to the first transmit power threshold set for the primary time slot dynamically.

12. The method of claim 11, wherein the adjusting the ratio dynamically comprises:
reducing the ratio of the second transmit power threshold to the first transmit power threshold if a proportion of traffic in an area beyond a predetermining distance to the center of the cell or sector to a total traffic of the cell or sector increases; and
increasing the ratio of the second transmit power threshold to the first transmit power threshold if the proportion of the traffic in the area beyond the predetermining distance to the center of the cell or sector to the total traffic of the cell or sector decreases.

13. A system for implementing soft time reuse in a wireless communication system, comprising:
a first unit, configured to select for a cell or sector at least one time slot as a primary time slot and at least another one time slot as a secondary time slot, and use the primary time slot at the border of the cell or sector, wherein the primary time slot selected for the cell or sector and a primary time slot selected for another cell or sector adjacent to the cell or sector are non-overlapped; and
a second unit, configured to set a first transmit power threshold for the primary time slot and a second transmit power threshold for the secondary time slot, wherein the first transmit power threshold is higher than the second transmit power threshold.

14. The system of claim 13, further comprising:
a first terminal in an area beyond a predetermining distance to the center of the cell or sector, configured to adapt the primary time slot;
a second terminal in an inner zone of the cell or sector configured to adapt the secondary time slot; the transmit power of the first terminal is not higher than the first transmit power threshold and the transmit power of the second terminal is not higher than the second transmit power threshold.

* * * * *